Jan. 30, 1962  F. A. FOSS  3,018,964
NAVIGATION COMPUTER
Filed Jan. 25, 1954  10 Sheets-Sheet 1

½ MILE PULSES
EAST OR WEST

*INVENTOR.*
FREDRIC A. FOSS
BY
*P E Henninger*

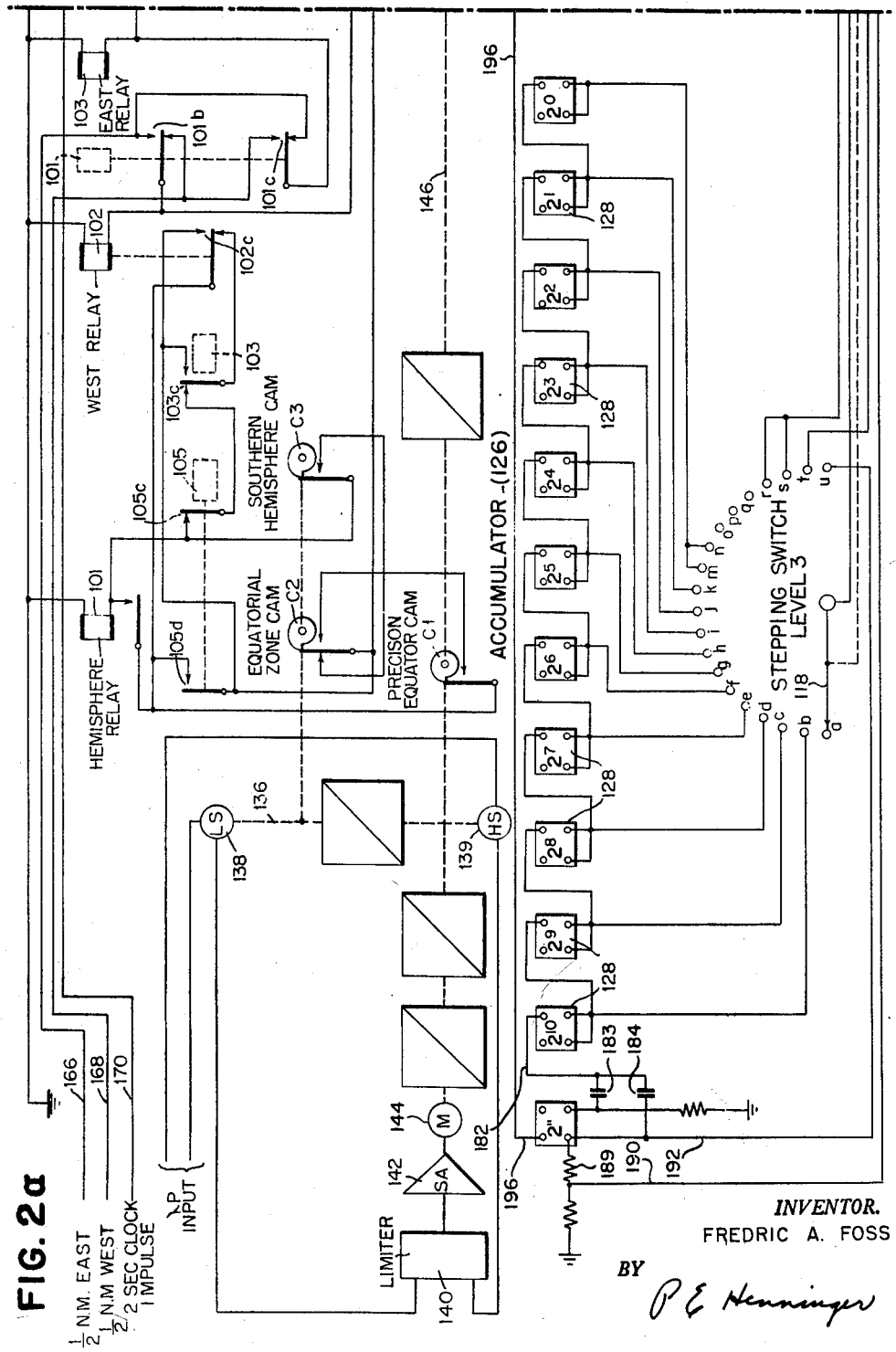

INVENTOR.
FREDRIC A. FOSS

INVENTOR.
FREDRIC A. FOSS

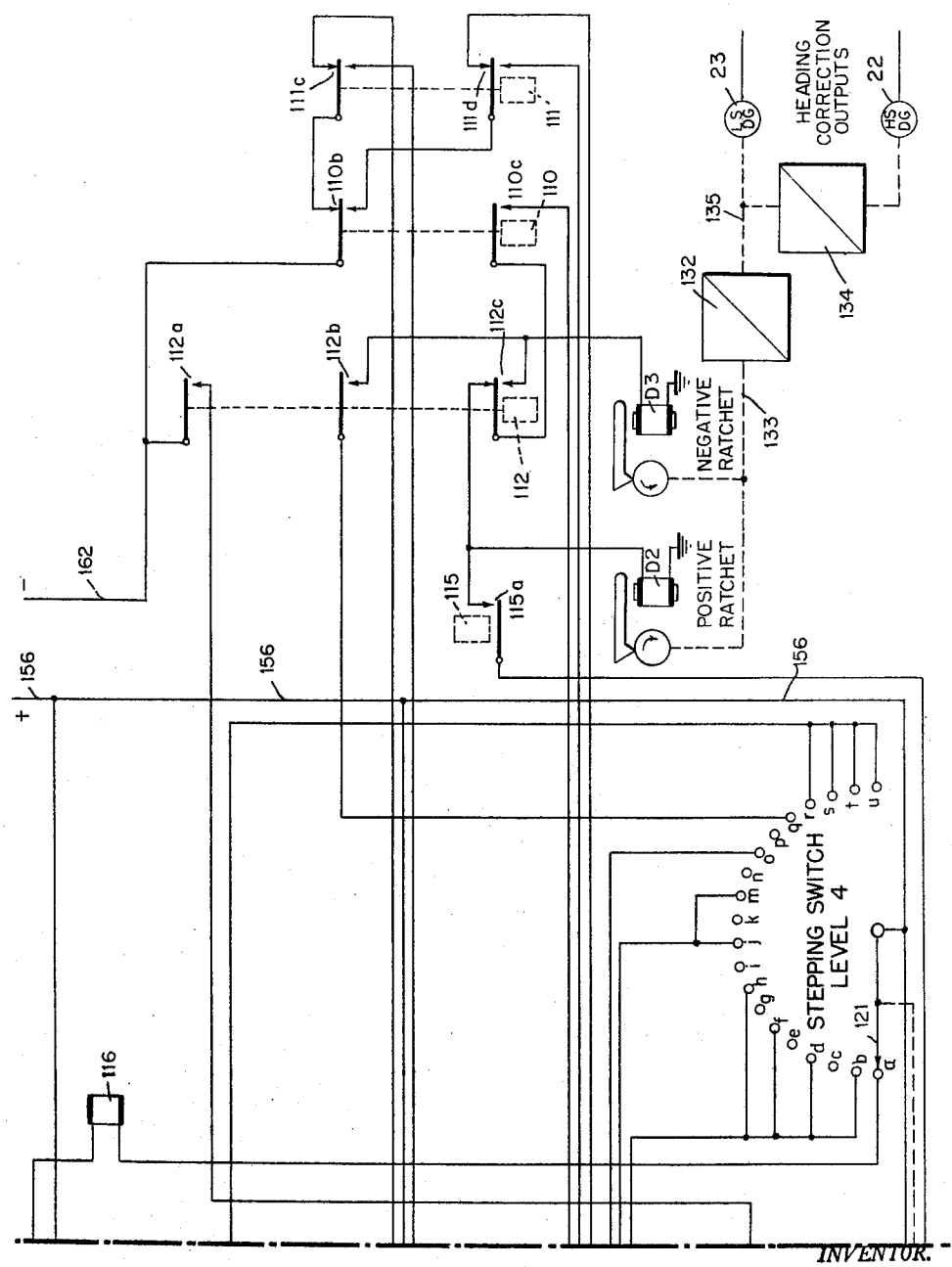

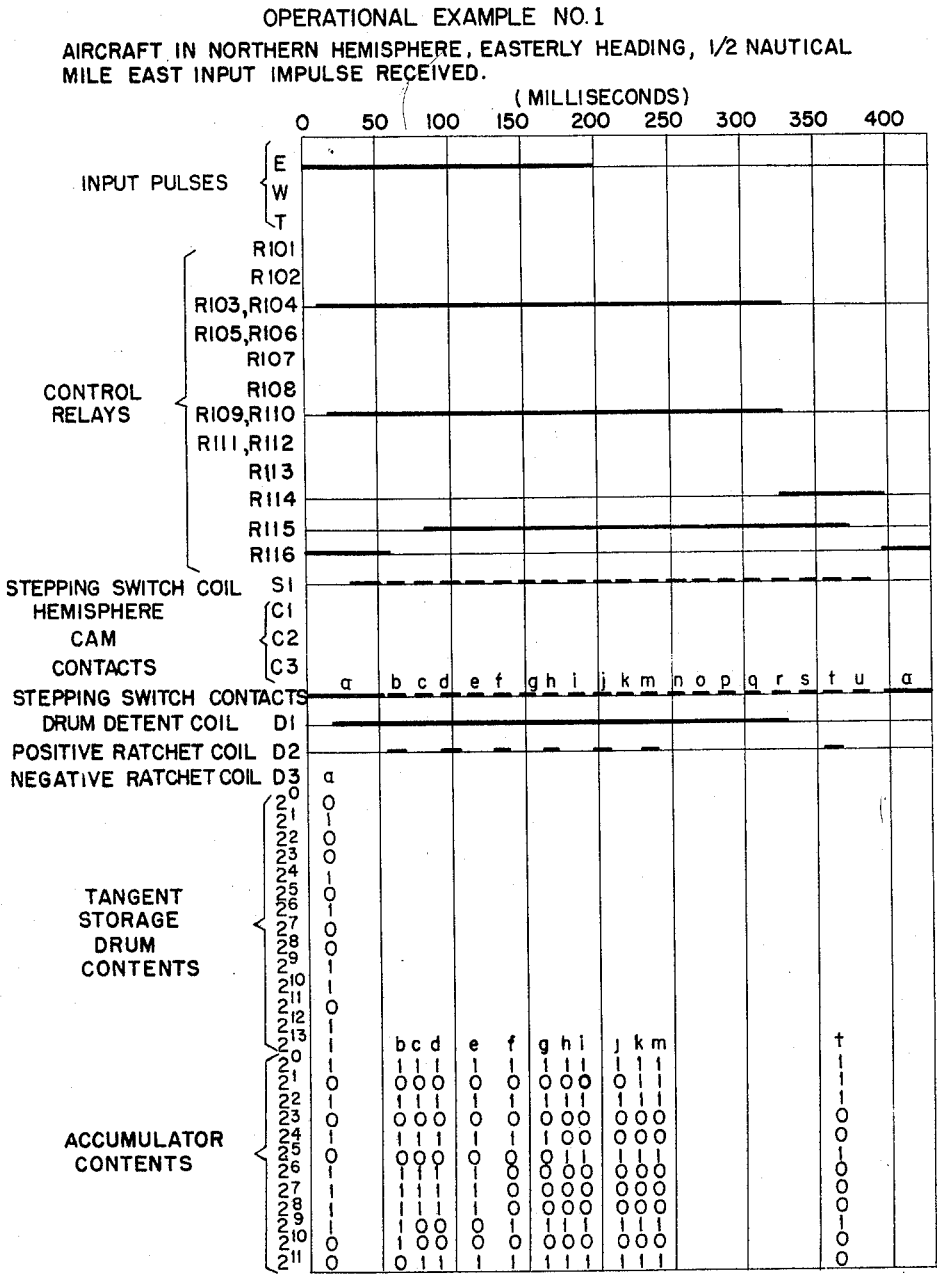

Jan. 30, 1962     F. A. FOSS     3,018,964

NAVIGATION COMPUTER

Filed Jan. 25, 1954     10 Sheets-Sheet 8

INVENTOR.
FREDRIC A. FOSS
BY

INVENTOR.
FREDRIC A. FOSS
BY
P E Henninger

Jan. 30, 1962　　　F. A. FOSS　　　3,018,964
NAVIGATION COMPUTER

Filed Jan. 25, 1954　　　　　　　　　　　　10 Sheets-Sheet 10

INVENTOR.
FREDRIC A. FOSS
BY
P E Henninger

3,018,964
NAVIGATION COMPUTER

Frederic A. Foss, Binghamton, N.Y., assignor to International Business Machines Corporation, New York, N.Y., a corporation of New York
Filed Jan. 25, 1954, Ser. No. 405,977
13 Claims. (Cl. 235—186)

This invention deals with a computer and more specifically with a particular type of computer that employs a storage element containing quantities having some predetermined arbitrary functional relationship to a shaft position of the storage element.

In a particular adaptation of the computer of this invention, the computer is used in connection with navigation to determine the angle of correction that must be algebraically added to a constant azimuth reference in order to give an accurate indication of geographic north. The constant reference is one that remains the same with respect to inertial space. To obtain such an accurate indication there are two corrections necessary when the constant reference is carried by a craft. One is related to the craft's rate of travel while the other is related to the earth's rate of rotation. Both of these corrections have a common function involved which is the latitude of the craft's location. Therefore, these two corrections are combined, in that the storage element necessary for each computation may be positioned simultaneously, the position corresponding to the craft's latitude. Predetermined quantities used in the calculations may be stored on the drums.

It is an object of this invention to provide a computer mechanism that may be adapted for general use but that is specifically used to produce an analog signal directly from predetermined digital quantities that are stored on a drum.

Another object is to provide an electronic accumulator that employs standard flip-flop trigger circuits that are connected with their inputs arranged in parallel, to be pulsed in sequence, while their outputs are arranged in series so that digital information may be fed in and accumulated to be fed out each time the flip-flop circuit corresponding to the highest order digit, produces its output pulse.

These and other objects including the novel features and principles of the invention will appear as the complete description of the system is set forth in the following description and accompanying drawings, by way of example.

In the drawings:

FIG. 1 is a schematic diagram of a navigation system for computing azimuth corrections wherein two computers according to this invention, are employed;

FIGS. 2a, 2b, 2c and 2d together show a complete circuit diagram of the two computers according to the invention;

FIGS. 3, 4 and 5 are timing diagrams illustrating three different operational examples of the computers;

Figure 1:
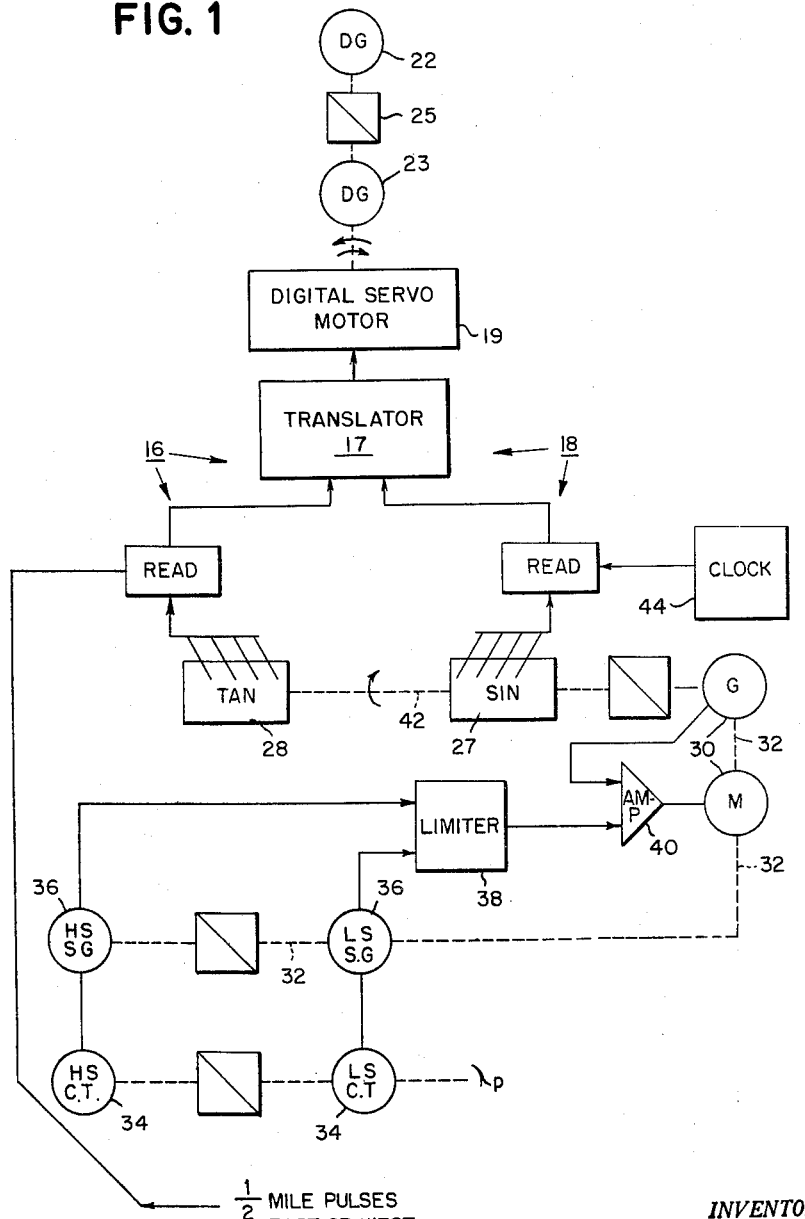

In order to best describe the computer of this invention a specific use will be set forth. As indicated above, such specific use is in connection with navigation and more specifically in computing the earth's rate and the craft's rate in order to make the necessary corrections that must be added to an azimuth reference that is constant in inertial space. These corrections are continuously added in increments. The size of the increments may be arbitrarily determined in advance to be such as to give a desired degree of accuracy.

It is to be noted that the constant reference may be a gyroscope, and in any case, the reference is being maintained with a vertical axis always vertical, i.e. the vertical axis of the inertial reference is maintained perpendicular to a plane that is tangent to the surface of the earth. In order to correct such a reference so that an azimuth indication may be maintained which lies along a meridian at all times, the constant inertial reference must be corrected for the rotation of the earth as well as for the displacement of the craft over the surface of the earth. The equations for expressing these corrections are as follows:

(1) $$h_{PR} = \Sigma K \tan \lambda$$

Where $h_{PR}$ = the heading correction due to the plane's (craft) rate.
$K$ = a constant.
$\lambda$ = the latitude of the craft.

This equation (1) is derived from the solid geometry involved in the navigation situation being considered, the increments being a predetermined distance of travel of the craft in an east-west direction.

(2) $$h_{ER} = \Sigma K_2 \sin \lambda$$

Where $h_{ER}$ = the heading correction due to the earth's rate.
$K_2$ = a constant dependent upon the increments of time employed.
$\lambda$ = the latitude of the craft.

This equation (2) is likewise derived from the solid geometry involved in the navigation situation under consideration. The increments in this case are intervals of time, e.g. two seconds.

The full navigational aspects of the azimuth corrections are set forth in a copending application Serial No. 402,470, filed January 6, 1954. It is sufficient for an understanding of this invention to note that an azimuth reference which is maintained horizontal at all times, and which acts to maintain an azimuth position that is constant relative to inertial space, must have two corrections added algebraically in order to constantly determine the azimuth relative to geographic north. The equations for these two corrections are set forth above. Their derivation is indicated, and by way of a more full explanation, it is pointed out that whenever an azimuth reference is maintained constant relative to inertial space and this same reference is located at the equator (with its plane of directions maintained horizontal), there is no variation in the azimuth directions, either because of the earth's rotation or because of the craft's movement over the earth (east or west). However, should the same azimuth reference be located at any other latitude than the equator, the fact that it is a constant inertial reference means that the azimuth direction lying along a meridian (passing through the earth's geographic north) will not continue to lie in this direction relative to the earth when the craft travels over the surface of the earth or when there is a passage of time (which means the earth has rotated).

Since this system is specifically for use in aircraft the term "plane's rate" will be used at times in the course of this disclosure. It is to be understood that this could be any other type of craft and the explanations would apply in the same manner.

As shown schematically in FIG. 1, there are two computers acting in a unitary manner together to introduce the two corrections due to earth's rate and plane's rate alternatively into the system. These computers act together in the alternative and have a common control circuit 17 that is marked "translator" in FIG. 1. There is a digital servo motor 19 to position the rotors of a set of high and low speed differential generators 22 and 23. These differential generators are well known electro servo system rotary machines which are connected between the control transformer and the signal generator of such a servo system to introduce a displacement signal that adds to or subtracts from the control transformer signal so as to produce an additional displacement in the signal generator of the servo system. In this manner the corrections as computed are represented by the rotary positions of the shafts of differential generators 22 and 23 which are geared together in a predetermined ratio as indicated by a gear reduction symbol 25.

The high and low speed differential generators 22 and 23 have their rotors positioned in accordance with the corrections as computed. The functional elements of the computer include the digital servo motor 19 and the translator or control circuit 17. The elements of the entire computer are self-explanatory when it is understood that the computer is solving the expressions represented by Equations 1 and 2 above. The sine and tangent terms of these two equations are set up on two separate storage mechanisms 27 and 28, respectively. These may either be in the form of a tape with a code carrying the respective term quantity thereon, or in the form of a set of coded helical drums. In either case the storage mechanisms 27 and 28 are positioned corresponding to the craft's latitude by means of a servo including a motor-generator set 30. The controlling signals for the motor-generator 30 are fed by the usual amplifier and limiter as illustrated, and the feed back to make this position servo is accomplished in the well known manner, i.e. by a mechanical connection illustrated by a dashed line 32.

The present latitude of the craft is computed by means of a separate computer that forms no part of the present invention; and any feasible means may be used to position a set of high and low speed control transformers 34 in correspondence with the present latitude of the craft as indicated by the symbol $\lambda p$ in FIG. 1. An example of such a computer may be found in a co-pending application Serial No. 396,838, filed December 8, 1953. This present latitude information might also be manually introduced in correspondence with current navigation information, by positioning the rotors of high and low speed control transformers 34 by hand.

THE COMPUTER SECTION

As previously described, when an azimuth reference such as a gyroscope is being maintained fixed in inertial space, there are two corrections which must be applied to such reference in order to maintain a reference for azimuth directions that is constant with respect to geographic north. These two corrections are for the earth's rate and for the plane's rate, and each correction is added continuously in predetermined increments. The earth's rate is a constant and therefore this correction may be added at any convenient intervals which will constitute the increments of time, e.g. every two seconds. The plane's rate is a variable and consequently the increments of correction will be added after the craft has traversed a predetermined distance in an east-west direction. As has been explained above, only the east-west component of ground travel will be employed since no correction change is necessary because of a change in the craft's position in the north-south direction. An example of the measuring of required corrections may be explained with reference to FIG. 1. It is to be noted that the present latitude of the craft will be employed to determine the position of control transformers 34 in the manner explained above, and a pair of high and low speed synchro generators 36 will be positioned correspondingly by means of a conventional servo system employing a limiter 38, an amplifier 40 and the motor generator set 30. There is included the usual mechanical feed back connection 32 which causes the synchro generators 36 to follow the position indicated by the control transformers 34. In this manner, the position of a shaft 42 that drives the sine and tangent storage mechanisms 27 and 28, will be maintained in a position corresponding to the craft's present latitude. Then after after each predetermined period of time, e.g. every 2 seconds, a clock controlled mechanism 44 will actuate control means in the earth's rate computer in a differential manner to position the high and low speed differential generators 22 and 23. At the same time, whenever a predetermined distance of ground travel, e.g. ½ mile (in an east-west direction) has been traversed, control means in the plane's rate computer will be actuated to produce an increment of correction that depends upon the quantity then standing on the tangent storage mechanism 28, and which is transmitted in a differential manner, as was the case with the earth's rate computer, to the high and low speed differential generators 22 and 23. Therefore, increments of correction will be effected continuously in terms of the rotational position of the high and low speed differential generators 22 and 23.

A detailed circuit diagram of the computers according to this invention being used as combined earth's rate and plane's rate computers, is shown in FIGS. 2a–2d.

These computer elements include sixteen relays, 101 through 116, which have captions adjacent to the relay winding for each of these relays to indicate the principal function of each relay. There is a stepping switch having four levels: level 3 being illustrated in FIG. 2a; level 1 being illustrated in FIG. 2b; level 2 being illustrated in FIG. 2c; and level 4 being illustrated in FIG. 2d. This stepping switch, when energized, will sequentially complete twenty circuits as illustrated by means of a stepping switch S1 (FIG. 2c) which continues to cause a stepping action of contact arms 118 (level 3—FIG. 2a), 119 (level 1—FIG. 2b), 120 (level 2—FIG. 2c), and 121 (level 4—FIG. 2d), from one contact to the next, all four arms moving simultaneously, until a cycle has been completed following the completion of the last circuit, i.e. circuit "u." There is a sine storage drum 122 (FIG. 2b) which is used in the correction for earth's rotation, in the manner explained above. Similarly, there is a tangent storage drum 124 (FIG. 2c) that is used in computing the vehicle's displacement correction as was explained above. Another element of the computer section is an accumulator 126 (FIG. 2a) that is an electronic binary accumulator having the desired number, e.g. 12, so-called flip-flop elements 128. These elements 128 are standard trigger circuits and operate in the usual manner to indicate the presence of, or pass on from the preceding element, a binary one in a given elements 128 of the accumulator 126.

It is to be understood that the sine and tangent terms of Equations 1 and 2 above are represented by binary information that is predetermined and built into the drums 122 and 124, respectively; there being cam surfaces so constructed that for each position of the drum in rotation there is a quantity representing the sine or tangent term of the respective equations for a given latitude; and the drums being rotated in unison and in correspondence with the craft's present latitude as explained above. Then each time an increment of correction for earth's rate or for craft's rate (as explained above) is to be determined, the quantity contained on the sine drum or on the tangent drum respectively, is read off by a cycle of the stepping switch that causes a heading correction to be made. Such heading correction is made directly from the highest orders of the tangent drum quantities, and is read into the accumulator 126 from the lower orders of the tangent drum and from all of the orders on the sine drum. The accumulator keeps adding these quantities as read in, until its highest order is reached by accumulation, when a correction is read out, to keep the heading accurate at all times.

To review briefly what the binary representation of the predetermined quantities for given latitudes consists of, it may be noted that in binary numbers the representation is by means of powers of two so that the lowest order which is the two to the zero power ($2^0$) is represented by a one (1) or by a zero (0) and each higher order is likewise represented by a one or a zero. In this way, any decimal number may be represented by a proper combination of ones and zeros in a series of binary orders. For example, starting with the lowest order on the right (as is done in the illustrations of the drums 122, 124 and the accumulator 126), a number 15 is represented by 1111, while a number 16 is represented by 10000. Likewise, a number 35 is represented by 100011 and a number 21 is represented by 10101.

Figure 6:
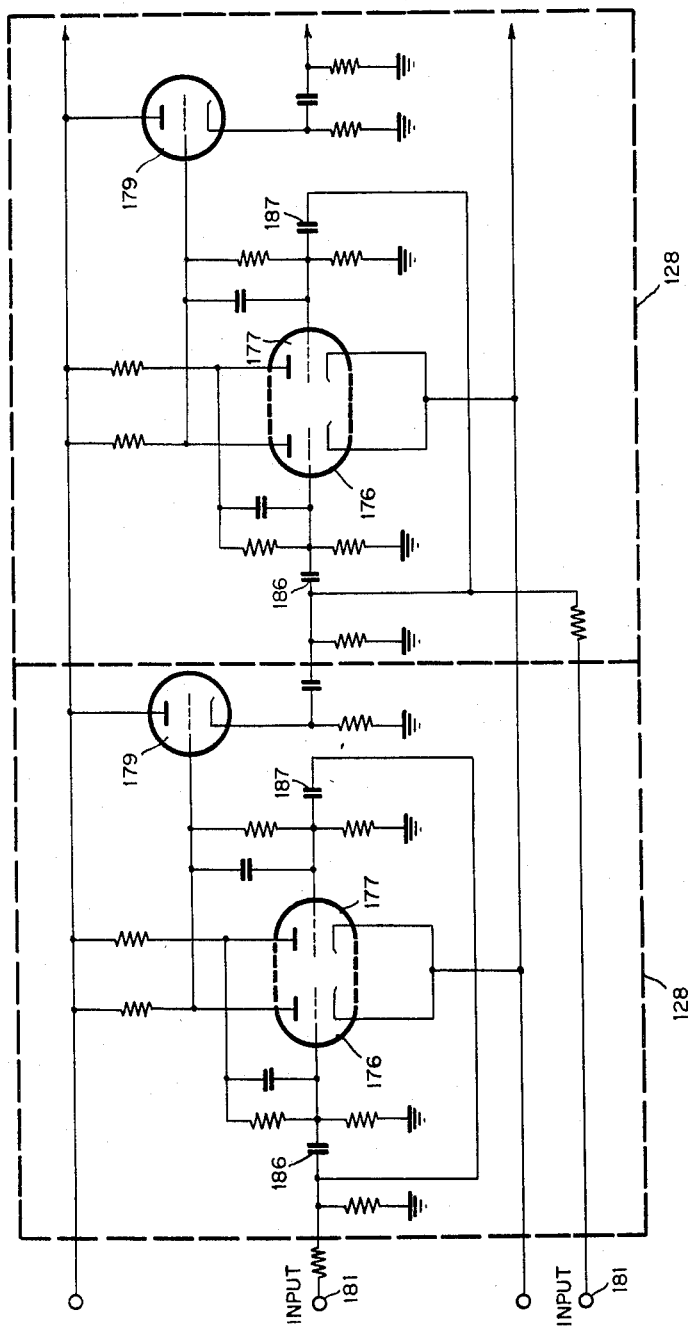
FIG. 6 is a wiring diagram of two of the identical elements of an accumulator that is part of the system employing the computers.
Figure 7:
FIG. 7 is a sketch showing the relative positions for FIGS. 2a—2d to make a complete circuit diagram thereof.

A detailed circuit diagram of two of the flip-flop elements 128 is shown in FIG. 6. Only two of the twelve elements 128 which correspond to the binary orders from $2^0$ through $2^{11}$ are shown in FIG. 6, because each of the elements 128 is identical and the action of two adjacent elements will be sufficient to explain the entire operation.

Each element 128 comprises two electron tubes 176 and 177, which may be two halves of a common envelope as shown. Also there is a tube 179 which is connected as a cathode follower and acts as isolation between succeeding elements 128. The two tubes 176 and 177 of each element 128 are connected so that they resemble two inverter circuits, each of whose plate outputs is coupled to the grid of the other circuit. The combination is stable in two separate states, i.e. either tube 176 or tube 177 is conducting while the other is cut off. In the circuit illustrated in FIG. 6, the lower order binary accumulator element 128 (FIG. 2a) is shown on the left and it will carry output signals over to the element 128 for the next higher order which is shown on the right. This is the reverse of the physical positions shown for the elements 128 in FIG. 2a.

By choosing one of the two stable states, e.g. when tube 176 is conducting, to represent a binary zero, the other stable state, i.e. when tube 177 is conducting, will represent a binary one. Therefore when the accumulator 126 (FIG. 2a) is empty (before any quantity from either storage drum 122 or 124 has been read in) the tube 176 will be conducting in each case and each element 128 will be representing a zero. Now each time a binary one is stored on one of the drums 124 or 122 (FIGS. 2c and 2b), and the stepping switch sweeps the contact for the input to the corresponding element 128 of the accumulator 126, a negative pulse will be introduced via an input terminal 181 (FIG. 6) to the two cross coupled circuits of tubes 176 and 177. This pulse will cause the flip-flop action of such a circuit to take place, so that the tube 176 or 177 which was conducting will be cut off while the other one will become conducting. Therefore, all elements 128 that received pulses will be flipped over and their tubes 177 will become conducting. Now whenever subsequently a negative pulse is received at the cross coupled circuits of the tubes 176 and 177, they will be flopped back to the original condition with tube 176 conducting. However, when the reverse or flopping action takes place, a negative pulse will be passed on to the next succeeding pair of tubes 176, 177 via the cathode follower circuit of tube 179, and this pulse will act on the cross coupled circuits of these tubes 176, 177 in the same manner as a negative pulse received from one of the drums 122 or 124. This passing on is a carry from one order to the next higher order in a normal manner for binary counting. This is similar to a decimal system carry from a nine, in one order, to a one in the next higher order while returning the nine to a zero.

It will be noted that when any element 128 has its tubes 176 and 177 flipped from zero condition to binary one condition, a pulse will be created in its cathode follower circuit of its tube 179, but this pulse will be a positive one so that it will not cause a flipping or a flopping of the next succeeding pair of tubes 176, 177.

It is to be noted also that the highest order element 128 of the accumulator 126 (FIG. 2a) is the $2^{10}$ element. There is an element 128 marked $2^{11}$ but it is merely used to pass on a carry from the $2^{10}$ element as will presently appear. Furthermore, in this connection, it is pointed out that in order to have each carry from the $2^{10}$ element 128 passed on by the $2^{11}$ element, the $2^{11}$ element is connected in a special way as illustrated in FIG. 2a (see also FIG. 8).

Figure 8:
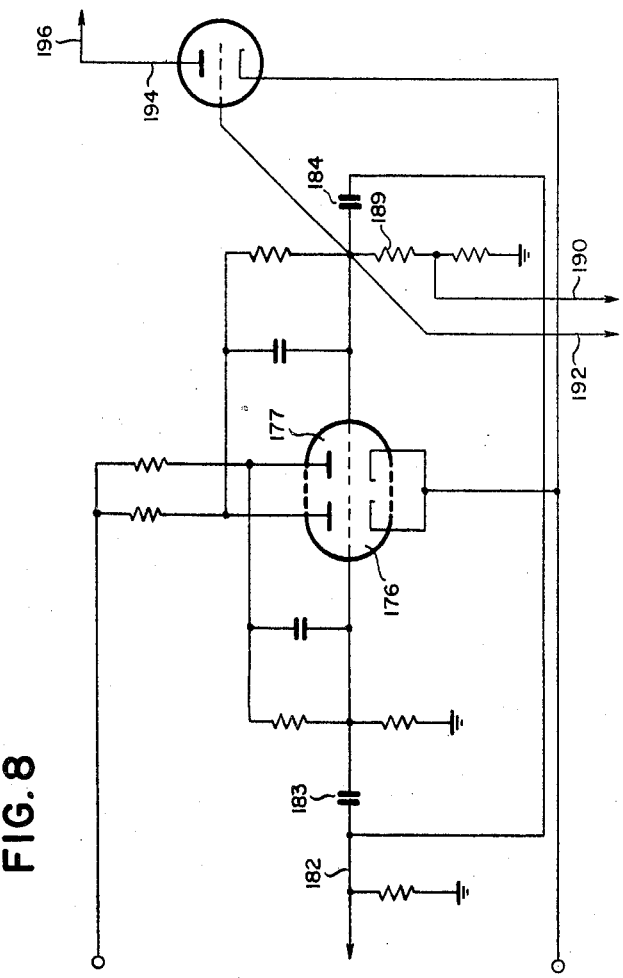
FIG. 8 is a circuit diagram of the highest order ($2^{11}$) flip-flop element.

Referring to FIG. 8 for the details of the circuit, it will be observed that a wire 182 carries the negative pulses from the $2^{10}$ element 128 (FIG. 2a), and such pulses then are connected to the grids of the pair of tubes 176, 177 (FIG. 8) in the usual manner via condensers 183 and 184. It is to be observed that there is no other circuit to the common sides of condensers 183 and 184, than the one via wire 182 just described above. There is, however, a circuit including a resistor 189 which involves wires 190 and 192. The purpose of this circuit is to produce a reset pulse at the end of each read cycle so that whenever there has been an output pulse from the $2^{10}$ element 128 (and consequently the accumulator relay 115—FIG. 2c—has been actuated) the pair of tubes 176 and 177 of the $2^{11}$ element (FIG. 8) will be flipped over to be ready to pass on the next pulse received from the output of the $2^{10}$ element 128. This reset pulse acts only on the grid of the one tube 177 so that in the event there has been no output pulse from the $2^{10}$ element 128 during any cycle, the status of the pair of tubes 176, 177 of the $2^{11}$ element will not be affected, and they will still remain ready to pass along any pulse received over the wire 182 from the $2^{10}$ element 128.

The reset pulse just described is produced by a short circuiting of the resistor 189. This occurs when the stepping switch passes through its last position, i.e. makes constact with contacts $u$, so that a circuit is completed over arms 118 and 119 (level 3 and level 1, respectively), contacts $u$ and wires 190 and 192.

The $2_{11}$ element 128 employs a tube 194 (FIG. 8) that has its grid connected to the grid of the tube 177, while the plate of this tube 194 is connected to one side of the winding of accumulator relay 115 via a wire 196. In this way the operation is such that a reset pulse does not cause the tube 194 to actuate the accumulator relay 115, but whenever the $2^{11}$ pair of tubes 176, 177 is flipped over by an output pulse from the $2^{10}$ element 128 the tube 194 does allow sufficient current to flow to actuate the relay 115.

The sweep of the stepping switch is such as to read the binary numbers from the higher orders to the lower orders in that direction. This is an arbitrary direction because the carry action between elements of the accumulator is sufficiently fast to complete a carry all the way along the line if necessary between each binary digit circuit, so that the sweep could be in the other direction insofar as the accumulator is concerned.

The output of the combined computer (FIG. 1) is mechanical in nature and comprises the positioning of the two synchro elements 22 and 23 (FIG. 2d), as stated. Such positioning is in rotation, of course, and is accomplished in this instance by means of a conventional double acting ratchet motor. The two ratchet elements employed in the motor are captioned "positive ratchet" (D2) and "negative ratchet" (D3) in FIG. 2d. The coils for actuating the ratchets have the reference characters D2 and D3, respectively. There is an appropriate gear reduction means 132 between a ratchet driven shaft 133 and an input shaft 135 of the low speed differential generator 23, which gear reduction was mentioned above in connection with the entire system. There is, of course, a necessary gear reduction 134 between the low speed differential generator 23 and the high speed differential generator 22.

There are three cams C1, C2 and C3 (FIG. 2a) that are driven from a shaft 136 (corresponding to dashed line 32 in FIG. 1) that is being positioned in rotation corresponding to the present latitude of the vehicle's position. These cams have captions indicating their functions, and their operation in the system will be described in greater detail below in connection with the operation of the computer section of the system. The present latitude input may be determined by any appropriate means as indicated above in connection with the entire system diagram, specifically FIG. 1. As used in the system of the invention this present latitude information will be transmitted by means of a conventional synchro arrangement such that a low speed synchro 138 (FIG. 2a) and a high speed synchro 139 (corresponding to low and high speed synchro generator 36, FIG. 1) will produce electrical signals that are fed into a limiter 140, for combining the low and high speed signals, and from thence the signal as combined is amplified by an amplifier 142 which feeds its output signal to a motor 144 (corresponding to motor-generator 30 in FIG. 1). This motor 144 supplies the power for mechanically positioning shaft 136 (corresponding to dashed line 32 in FIG. 1), as well as for positioning the connecting shafts which position the various elements in a predetermined manner, e.g. a shaft 146 is positioned in a manner to correspond with shaft 136 so that the sine storage drum 122 and the tangent storage drum 124 will be maintained in a position corresponding to the present latitude of the vehicle. The usual servo generator (not shown) may be included in the control circuit of motor 144 to obtain a rate feed back, should this be found desirable.

The sine drum 122 and the tangent drum 124 are each similar in construction and differ only in the number of digits to which the sine and tangent quantities are carried. The reason for this is that the sine quantities vary only to a maximum of unity while the tangent quantities vary to a practical maximum of 28.64 minutes where the K term of Equation 1 equals one-half and the latitude equals eighty-nine degrees. These quantities are set up on the drums in binary code. The drums are so constructed that there are quantities encoded on the drum surfaces that correspond to predetermined intervals of latitude of the craft. In this way, the proper quantity may be read off after each increment of change. The increments of change have been explained above as being predetermined increments of east-west ground travel of the craft, e.g. one-half nautical mile, in the case of the tangent drum-plane's rate correction, Equation 1; and as being predetermined increments of time, e.g. two second intervals, in the case of the sine drum-earth's rate correction, Equation 2. The quantities as read off the tangent drum are used to actuate the positive and negative ratchets D-2 and D-3 (FIG. 2d) when the quantities have high order binary digits therein. The quantities below a predetermined binary digital order in the tangent drum and all the quantities in the sine drum are read off into the accumulator 126, from where they are read out as they accumulate into the high order level.

It is to be understood that the quantities encoded in the storage drums are predetermined by a solution of Equations 1 and 2 for given values of latitude. These quantities are then represented by a binary code arrangement on the drum surfaces. The details of the structure of the drums may vary but there is a series of cam surfaces located longitudinally along the length of the drum, each of which is constructed for actuating a switch, and each of which is designated by its binary order representation, e.g. $2^0$–$2^{13}$ on the tangent drum 124 and $2^0$–$2^8$ on the sine drum 122. The drums 122 and 124 are rotated by the common shaft 146 to an angular position that corresponds with the craft's present latitude as taken in predetermined steps, e.g. one degree, from eighty-nine degrees north to eighty-nine degrees south. At each of these positions the cams will actuate the corresponding switches to read out the quantity that was built into the drum, such quantity being represented in binary form, i.e. a one in the $2^0$ position equals one, a one in the $2^1$ position equals two, a one in the $2^2$ position equals four, a one in the $2^3$ position equals eight, etc., up to the desired number of positions to obtain a quantity having the desired number of digits for the required accuracy.

OPERATION

The operation of the computer in introducing corrections for earth's rate and craft's rate at the rotors of differential generators 22 and 23 (FIG. 1) will be set forth by several operative examples with reference to the circuit details as illustrated in FIGS. 2a–2d. First of all, it should be noted that relays are used as the primary control means. Also, there are the three cams C1, C2 and C3 (FIG. 2a) that are driven in correspondence with the craft's present latitude and act to control the operations of the computer in order to produce the required sense of output rotation depending upon the hemisphere, the direction of travel of the craft whether easterly or westerly, etc. Furthermore, there is the stepping switch having four levels as illustrated and having twenty positions labeled "a" through "u" (omitting "l") which steps around one complete circle from the home position $a$ each time a computer cycle is initiated. (The stepping switch contacts are illustrated in a semi-circle for convenience in drawing the circuit diagram.)

The cams C–1 and C–2 provide for equatorial crossing detection. The accuracy of such detection should be sufficient to avoid accumulating any errors if the craft travels close to the equator for any appreciable distance. Therefore, cam C1 is a fine detection cam which makes a predetermined number of revolutions to one of the cam C2 and it is cam C1 that makes the equatorial crossing determination with the required degree of accuracy, by means of its switch. As may be seen in FIG. 2a the hemisphere relay 101 controls a circuit over its contacts 101a, which circuit includes the switch controlled by cam C1 in series with the switch controlled by cam C2. In this way the opening or closing of the cam C1 switch is the accurate equatorial crossing indication during one particular revolution of cam C1 which revolution is determined by the switch controlled by the coarse detection cam C2.

Consider first the processing of a positive angular azimuth correction. Assume that the binary number to be read from the tangent drum 124 (FIG. 2c) is 11101010111000. The binary one in the $2^{13}$ position on the drum 124 will be represented by a set of contacts 154 being closed. Therefore, during a cycle of the stepping switch four sequential pulses will each pass through closed contacts 154 from stepping switch level 4 (FIG. 2d) and each energize the positive ratchet coil D2 via the obvious circuit that may be traced from a + supply line 156 to contact arm 121 and then via stepping switch contact points $b$, $d$, $f$ and $h$ to the contacts 154 and back via contacts C110 and C112 to one side of the ratchet coil D2, the other side of which is grounded. Similarly, the binary one in the $2^{12}$ position is represented by having contacts 158 (FIG. 2c) closed. In this case, however, only two sequential pulses are produced from the switch contact points $j$ and $m$ (FIG. 2d) of level 4 of the stepping switch over similar circuits that now include the $2^{12}$ contacts 158. Then again the binary one in the $2^{11}$ position is represented by having contacts 160 closed, and in this case one pulse only will be produced as the stepping switch contact "$o$," level 4, is closed. These pulses through the ratchet coil D2 produce a positive rotation of the rotors of the high and low speed differential generators 22 and 23 (FIG. 1), each pulse producing a predetermined amount of rotation depending upon the design of the ratchet motor. As explained above, the positive ratchet coil D2 will cause a rotation in a given direction while the negative ratchet coil D3 will produce the opposite direction of rotation.

Binary ones in any of the remaining $2^{10}$, $2^9$, $2^8$, $2^7$, $2^6$, $2^5$, $2^4$, $2^3$, $2^2$, $2^1$ or $2^0$ drum positions will be added in the electronic accumulator 126 (FIG. 2a). The accumulator 126 has its inputs for the elements 128 (representing binary ones from the $2^{10}$ one to the $2^0$ one) connected to the stepping switch, level 3 contacts $b$ to $m$, respectively. Therefore, by means of circuits to be traced, a time-sequenced pulsing of the elements 128 is had, dependent upon the state of the corresponding drum contact points. Continuing with the same example given above, there are binary ones in the $2^9$, $2^7$, $2^5$, $2^4$, and $2^3$ tangent drum 124 positions, and so these contacts of this drum 124 will be closed to the right as viewed in FIG. 2c and pulses will be inserted into the inputs of the corresponding accumulator elements 128, e.g. a pulse circuit for the binary one in the $2^9$ position on the drum may be traced from a "—" supply line 162 over contacts 110b (now energized to the down position when viewed as illustrated in FIG. 2d) to contacts 111d (now de-energized) then to contacts 164 of tangent drum 124, and from there to contact $c$ of level 2 of the stepping switch. The circuit then continues over contact arm 120 of level 2 and goes to contact arm 118 of level 3 (FIG. 2a) and then via contact $c$ of level 3 to the input of the $2^9$ element 128 of the accumulator 126. In the accumulator 126, internal carries between elements 128 thereof will be processed completely before another input signal can be introduced by the stepping switch. If at the end of a reading cycle, the accumulator 126 holds a number equal to or greater than $2^{11}$, the positive ratchet coil D2 will be pulsed once and the $2^{11}$ element 128 of the accumulator 126 will be restored to its zero condition. The pulsing of ratchet coil D2 is accomplished by an accumulator relay 115 (FIG. 2c) that is in the binary "one" tube plate circuit of the $2^{11}$ element 128. When relay 115 is energized, a circuit to pulse the ratchet coil D2 is completed from + supply line 156 to contact $t$ of level 2, then to contact $t$ of level 3 via the connection between contact arms 120 and 118, and then back to contacts 115a and then directly to one side of ratchet coil D2, the other side of which is grounded.

Consider next the processing of a negative angular azimuth correction. The computer is so designed that the accumulator 126 only adds positive numbers, therefore any negative angular increment correction must be obtained by an interaction of the accumulator 126 and the digital servo motor comprising positive and negative ratchet coils D2 and D3. For example, take a negative correction for craft's rate having a binary number with binary digits 1, 0 and 1 stored in the $2^{13}$, $2^{12}$ and the $2^{11}$ tangent drum 124 storage positions. The stepping switch level 4 will cause pulses to be set up at the level 4 contacts, $b$, $d$, $u$ and $h$ as well as at contact $o$ of level 4, in the same manner as was the case with positive pulses; but now the complement relay 112 will be energized and therefore the pulses will be transferred to the negative ratchet coil D3 by means of contacts 112c. The binary number stored in the lower order positions ($2^{10}$–$2^0$) of the tangent drum 124, is converted into its complement and read into the accumulator 126. The complementary action is obtained by reading from the left (as viewed in FIG. 2c) or break side contact points e.g. contacts 164 which will be open in the example given. Otherwise, the reading into the accumulator elements 128 is as before, carried over various contacts of levels 2 and 3 of the stepping switch. Additionally, however, during each negative angular heading correction cycle, the negative ratchet coil D3 is pulsed once automatically, as is likewise the $2^0$ accumulator element 128. The circuits for these automatic high and low order pulses will be obvious when it is pointed out that contact $n$ of level 3 is connected to the $2^0$ element 128 of the accumulator 126 while the contact $n$ of level 2 is directly connected to contacts 112a of the complement relay and thence to "—" line 162. Similarly, contact $q$ of level 4 is connected to contacts 112b of the complement relay and so is the negative ratchet coil D3. The following table summarizes the way in which the computer handles a negative angular azimuth correction:

| Tangent Drum Storage Position | $2^{13}$ $2^{12}$ $2^{11}$ $2^{10}$ $2^9$ $2^8$ $2^7$ $2^6$ $2^5$ $2^4$ $2^3$ $2^2$ $2^1$ $2^0$ | |
|---|---|---|
| Tangent Drum Number (Make) | 1 0 1 0 1 0 0 1 1 0 0 1 0 1 | = 10853 units |
| Processed by Negative Ratchet Directly | 1 0 1 | = —10240 |
| Automatic Neg. Ratchet Pulse | 1 | = — 2048 |
| Total Neg. Angular Increment | | —12288 units |
| Accumulator Input from Drum (Break) | 1 0 1 1 0 0 1 1 0 1 0 | =+ 1434 |
| Automatic Accumulator Input Pulse | 1 | =+ 1 |
| Total Positive Angular Increment | | + 1435 units |
| Total Negative Angular Increment | | =—12288 |
| Total Positive Angular Increment | | =+ 1435 |
| Net Angular Increment | | =—10853 units |

To illustrate the operation of the relay control circuits in connection with the storage drums 122 and 124 and the accumulator 126 three operational examples will be given with timing charts to illustrate the described actions.

*Operational example No. 1*

Assuming a one-half nautical mile east pulse is received over a line 166 (FIG. 2a) marked "½ N.M. East"; and that the craft or plane is in the northern hemisphere heading in an easterly direction. The control actions may be readily traced on the circuit diagram of FIGS. 2a–2d, and the timing of the various actions may be followed with reference to FIG. 3. The control actions are as follows (it is to be noted that all relay contacts are illustrated in their de-energized positions):

The east relays 103 and 104 are operated by the input east pulse. The plane's rate relays 109 and 110 are then energized. The drum detent coil D1 circuit is then completed. The computation cycle is then commenced by the closure of the detent coil contacts D1a which are in the stepping switch coil S1 circuit.

The tangent storage drum 124 is selected by the operation of the plane's rate relay 110 by its contacts 110b and 110c. The binary one in the $2^{13}$ position of the tangent storage drum is transmitted as a series of four pulses by means of level 4 of the stepping switch (points $b$, $d$, $f$ and $h$) into the positive ratchet coil (D2). The binary one in the $2^{12}$ position of the tangent storage drum is transmitted as a series of two pulses by means of level 4 of the stepping switch (points $j$ and $m$) into the positive ratchet coil (D2). Point $o$ of level 4 in the stepping switch is not active during this computer cycle because of the presence of a zero in the $2^{11}$ position of the tangent storage drum. Points $b$ through $m$ of level 2 and points $b$ through $m$ of level 3 are used to transfer the binary data in the tangent drum positions $2^{10}$ to $2^0$ into the accumulator 126. The accumulator 126 contains a binary one in its $2^{11}$ position at the conclusion of this addition process. This carry from the accumulator 126 is transmitted to the positive ratchet coil D2 as a pulse via point $t$ of level 3 of the stepping switch. The accumulator relay 115 is reset by means of points $u$ on levels 1 and 3 of the stepping switch. The reset relay 114 is energized through point $r$ of level 3 of the stepping switch. The reset relay 114 de-energizes the east relays 103 and 104 and the plane's rate relays 109 and 110 and detent coil D1. The home relay 116 is energized via point a of level 4 of the stepping switch. This relay 116 is used to de-energize the reset relay 114. The stepping switch coil S1 is energized through the detent contact D1a up to point r in the computation cycle. The stepping switch coil S1 is energized via points r, s, t and u of level 4 during these points in the computation cycle. It is de-energized at the home point a and cannot be energized again until the home relay 116 has caused the reset relay 114 to re-establish a control path to the stepping switch coil S1.

*Operational example No. 2*

Figure 2B:
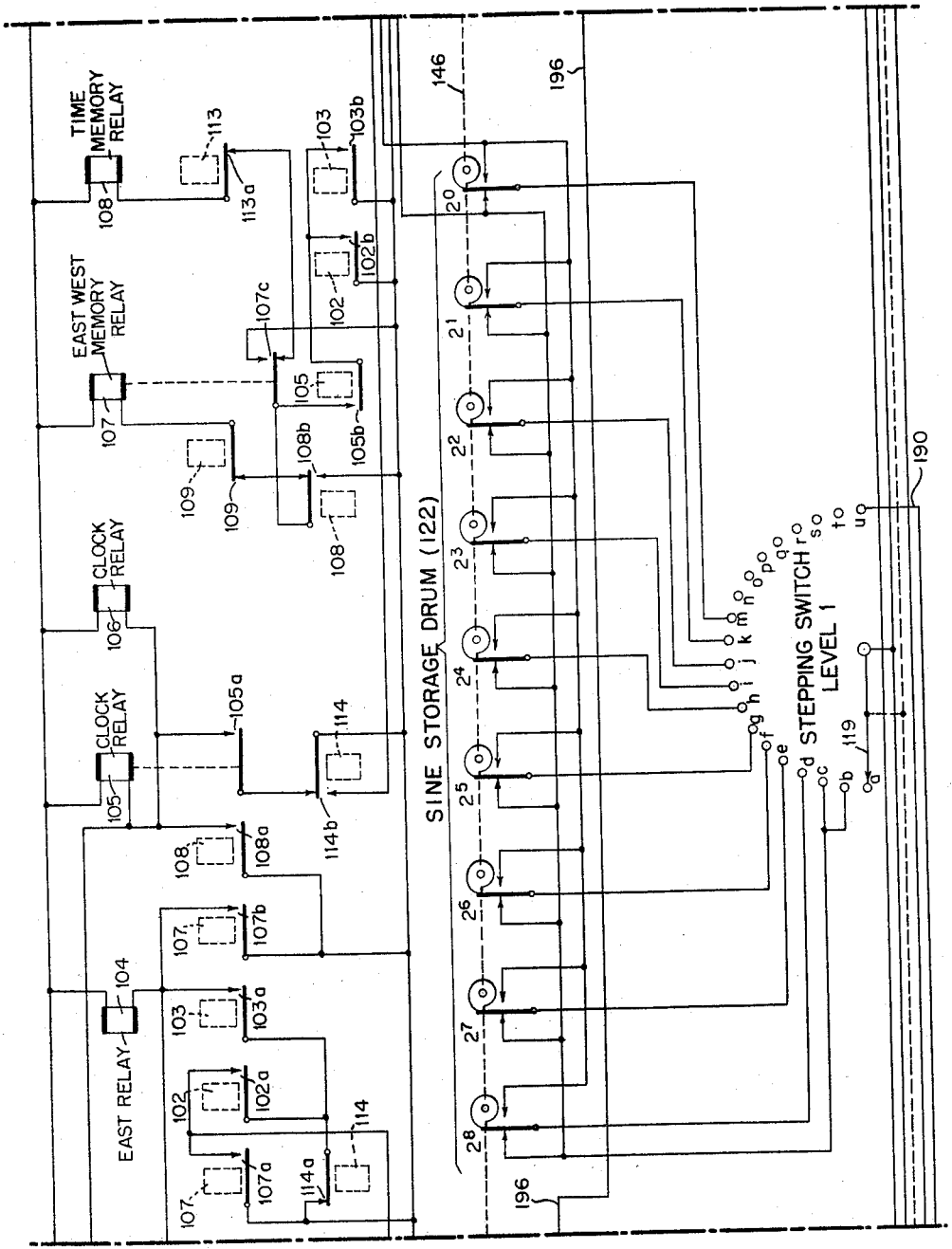
Figure 2C:
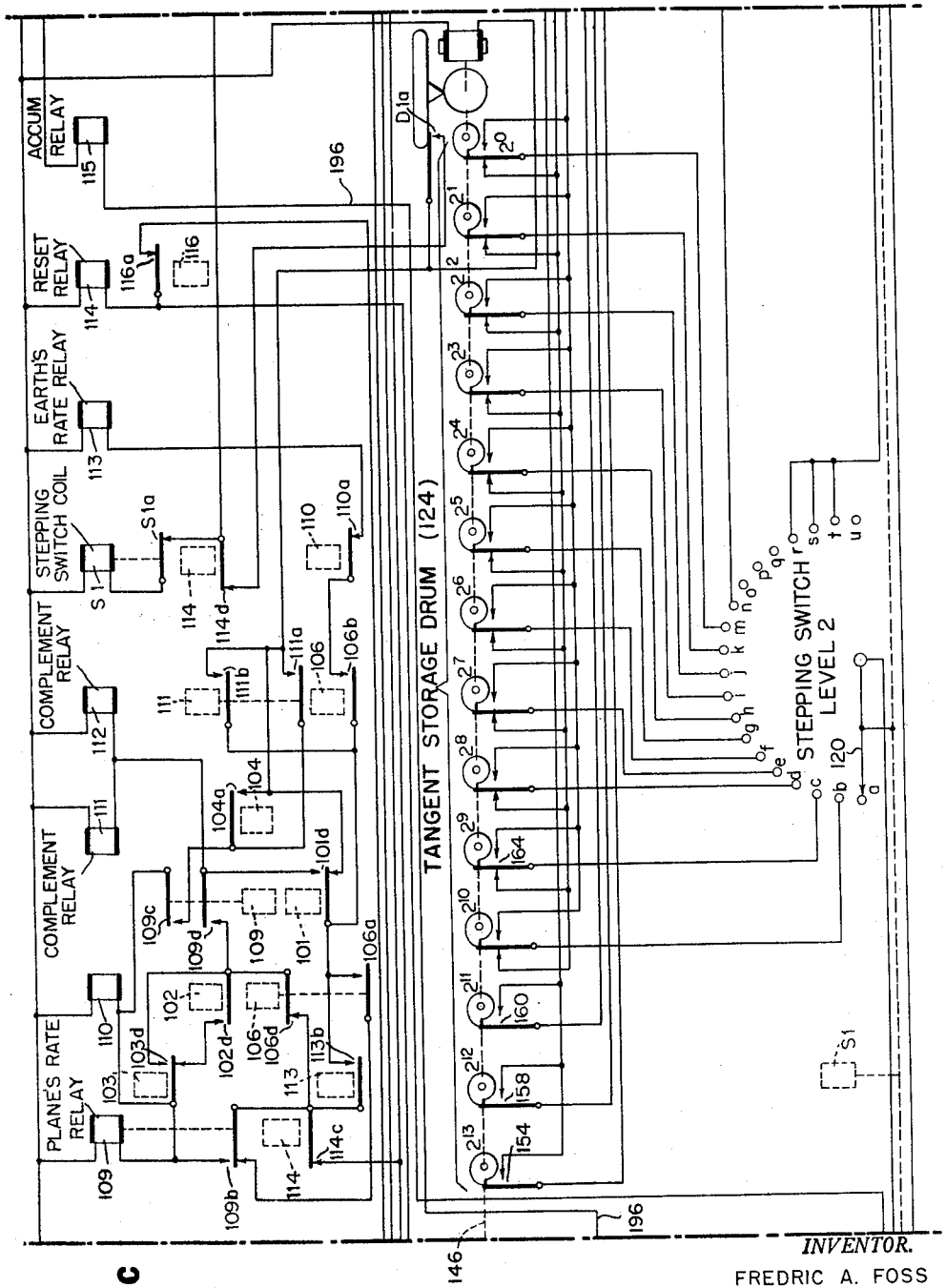
Figure 4:
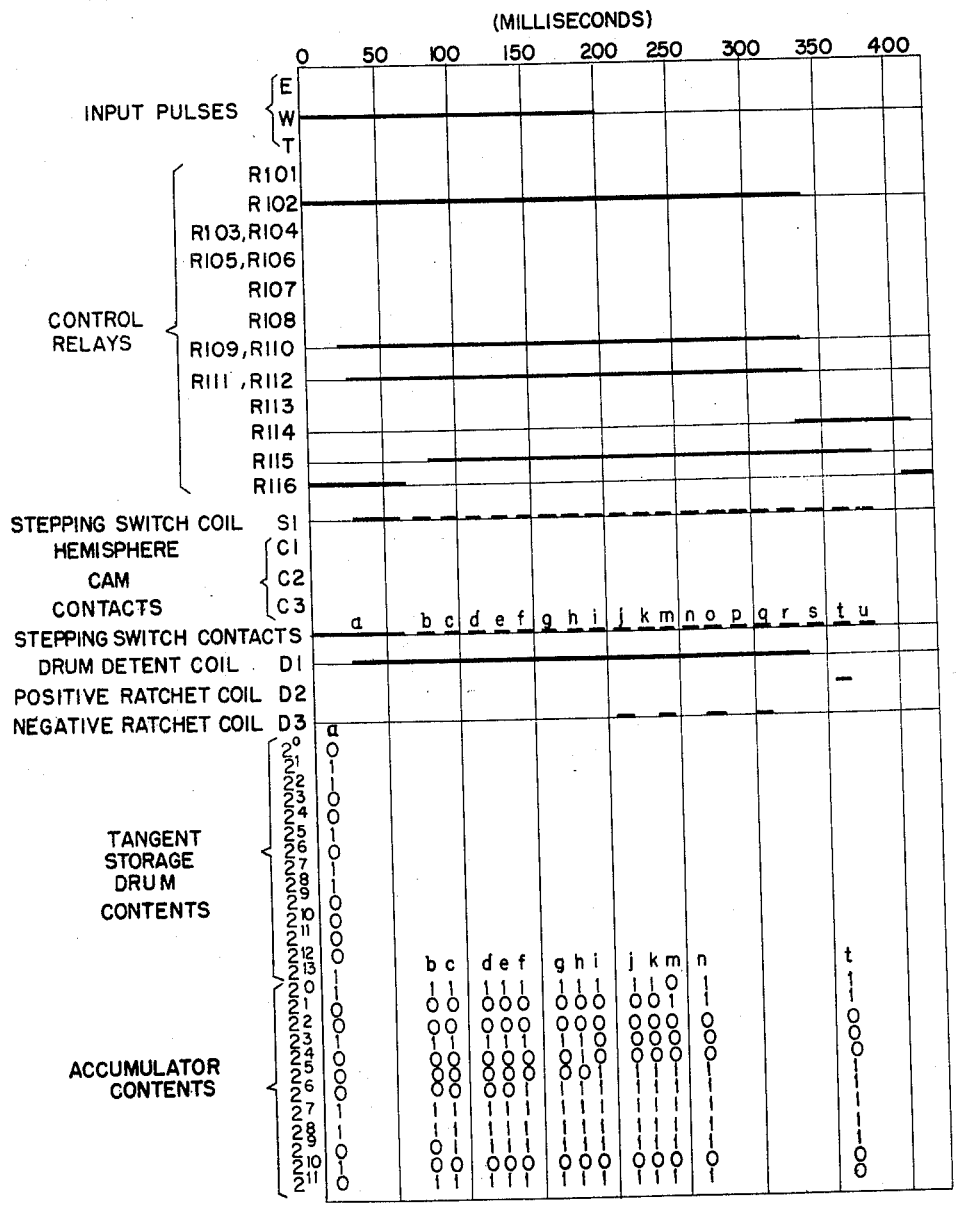

To illustrate the computer operation when a negative angular motion is produced, the following example may be traced on the circuit diagram of FIGS. 2a–2d, and the timing may be followed with reference to FIG. 4, assuming the craft is in the northern hemisphere with a westerly heading. A one-half nautical mile west pulse is received over a line 168 (FIG. 2a).

The west relay 102 is operated by the input west pulse. The plane's rate relays 109 and 110 are then energized. The complement relays 111 and 112 are then energized. The drum detent coil D1 circuit is then completed. The computation cycle is then commenced by the closure of the detent coil contacts D1a which are in the stepping switch coil S1 circuit.

The tangent storage drum 124 is selected by the operation of the plane's rate relay 110. The drum complement (normally closed) contact points in the $2^{10}$ to $2^0$ positions are selected by the complement relay 111. The drum (normally open) contact points in the $2^{13}$, $2^{12}$, $2^{11}$ positions are switched by the complement relay 112 to the negative ratchet coil D3. The binary one in the complement side of the $2^{12}$ position of the tangent storage drum 124 is transmitted as a series of two pulses by means of points j and m, level 4 of the stepping switch into the negative ratchet coil D3. The binary one in the complement side of the $2^{11}$ position of the tangent storage drum 124 is transmitted as a single pulse by means of point o level 4 of the stepping switch, into the negative ratchet coil D3. Since the computer is in a complement cycle, the negative ratchet coil is also automatically pulsed once by means of point q level 4 of the stepping switch, and the $2^0$ electronic accumulator position is automatically pulsed once by means of point n level 2 and point m of level 3 of the stepping switch. Points b through m of level 2, and points b through m of level 3 are used to transfer the complementary binary data in the tangent drum 124 positions $2^{10}$ to $2^0$ into the accumulator 126. The accumulator 126 contains a binary one in its $2^{11}$ position at the conclusion of this addition process. This carry from the accumulator 126 is transmitted to the positive ratchet coil D2 as a pulse via point t of level 3 of the stepping switch. The reset action and stepping switch coil control is identical as previously described in connection with Example No. 1.

*Operational example No. 3*

Figure 5:
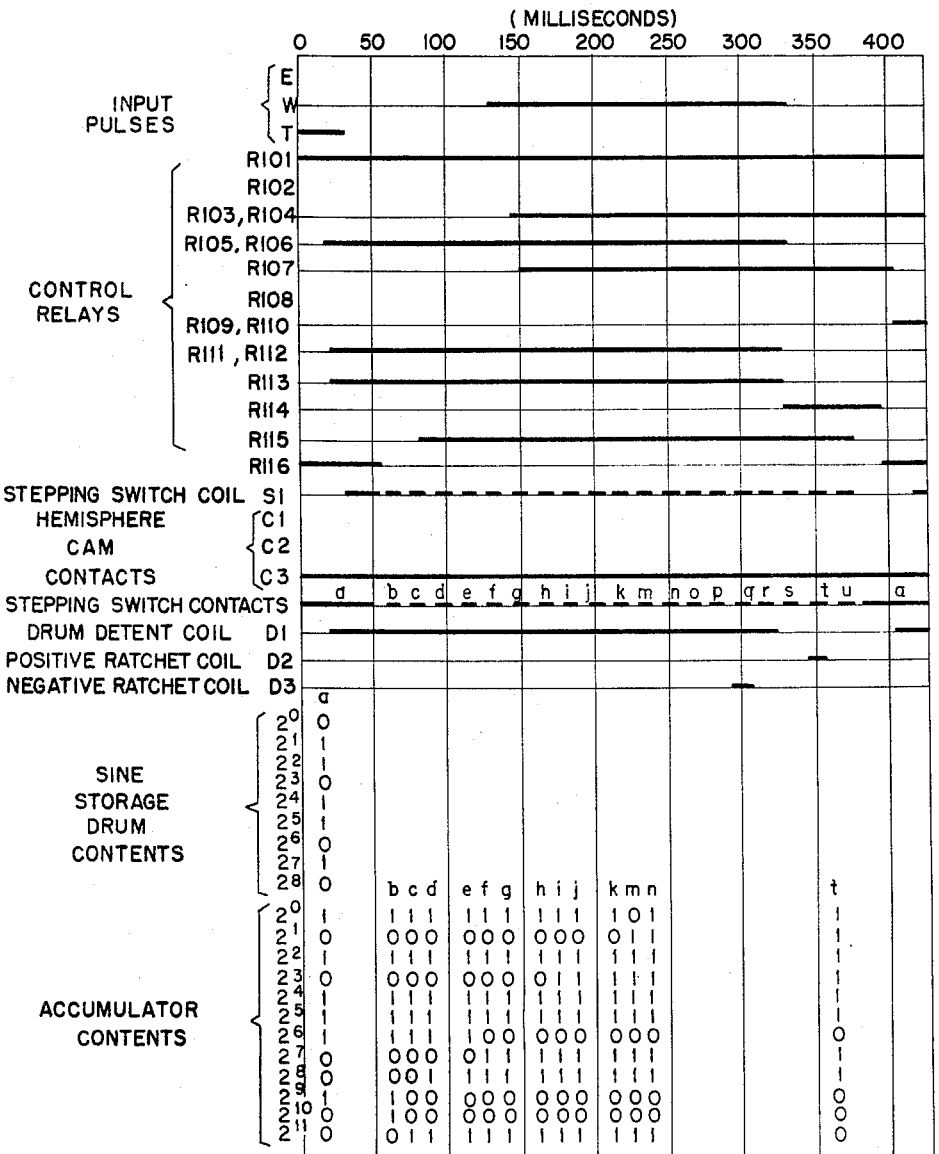

To illustrate the computer operation when a two second clock pulse is received, and in addition the operation when a one-half nautical mile west pulse is received during the processing of the time pulse, the following example may be traced, on FIGS. 2a–2d and the timing followed on FIG. 5 assuming the craft is in the southern hemisphere with a westerly heading. A two second clock pulse is received over a line 170. The clock relays 105 and 106 are operated by the input two second clock pulse. The complement relays 111 and 112 and earth's rate relay 113 are then energized. The drum detent coil D1 is then energized. The computation cycle then commences as previously discussed. Since the plane's rate relays 109 and 110 are de-energized, the sine drum 122 is selected.

Binary ones are automatically pulsed into the accumulator $2^{10}$ and $2^9$ positions by means of points b and c, level 3, and level 1. The sine drum complement (normally closed) contact points in the $2^8$ to $2^0$ positions are selected by the complement relay 111. Points d through m of level 3 and points d through m of level 1 are used to transfer the complementary binary data in the sine drum positions $2^8$ to $2^0$ into the accumulator 126. Since the computer is in a complement cycle, the negative ratchet coil D3 is automatically pulsed once by means of point p, level 4, of the stepping switch, and the $2^0$ electronic accumulator position is automatically pulsed once by means of point n, level 2, and point n, level 3. The accumulator 126 contains a binary one in its $2^{11}$ position at the accumulator 126 which is transmitted to the positive ratchet coil D2 as a pulse via point t of level 3 of the stepping switch.

This operational example also assumes that a west pulse appears one hundred and twenty-five milliseconds after the initial clock pulse. The east relays 103, 104 are operated by the input west pulse since the craft is in the southern hemisphere. The east-west memory relay 107 is then operated. These relays 103, 104 and 107 remain operated throughout the duration of the computer earth's rate cycle and then initiate a plane's rate computer cycle by establishing circuit paths to the necessary control relays and the stepping switch coil. The plane's rate cycle is then performed as indicated in operational Example No. 2 except that the aircraft is in a different hemisphere.

It is to be understood that the invention is not limited to the specific illustration herein shown and described but may be carried out in other ways without departure from its spirit.

I claim:

1. A navigation computer for use with a moving craft for determining an azimuth correction based on the earth's rate and on the craft's rate comprising first drum means for storing predetermined quantities representing a given increment times the sine of the craft's present latitude, second drum means for storing predetermined quantities representing a given increment times the tangent of the craft's present latitude, means for rotating both said first and second drum means to a position corresponding with the craft's present latitude, means for periodically reading said stored information from the drums in accordance with time and craft travel east or west, and means for translating the information as read directly into increments of azimuth correction.

2. A navigation computer for use with a moving craft for determining an azimuth correction based on the earth's rate and on the craft's rate comprising first drum means for storing in binary representation predetermined quantities representing a given increment of earth's rotation times the sine of the craft's present latitude, second drum means for storing in binary representation predetermined quantities representing a given increment of craft displacement in an east-west direction times the tangent of the craft's present latitude, means for rotating both said first and second drum means to a position corresponding with the craft's present latitude, means for translating said binary quantities into analogs and continuously integrating such analogs including a plurality of electric circuit means controlled by said first and second drum means, cyclically operable switching means for sequentially testing said circuit means, and motor means controlled by said circuit means and cyclic means for producing displacements proportional to said quantities.

3. A computer having drum means for storing digital information of a predetermined magnitude corresponding to predetermined increments of a given variable, means for reversibly positioning said drum means in accordance with said given variable, means for reading the digital information from said drum means at intervals in accordance with a given function, and means for directly actuating a motor in accordance with the information as read.

4. A computer comprising cam surfaced drum means for storing predetermined digital quantities thereon, cam actuated electric switch means corresponding to said digits for reading said quantities, electric motor means controlled by a predetermined group of the high order digits of said quantities for translating said digital quantities directly into corresponding angular motion, an accumulator controlled by a predetermined group of the low order digits for summing the low order digits of said quantities and passing on to the high order digits the quantities as accumulated, and means fo positioning said drum means in accordance with a variable that determines which of the digital quantities is to be read from said drum means.

5. A computer comprising cam surfaced drum means for storing predetermined digital quantities thereon, cam actuated electric switch means corresponding to said digits for reading said quantities, electric motor means controlled by a predetermined group of the high order digits of said quantities for translating said digital quantities directly into corresponding angular motion, an electronic accumulator employing flip-flop trigger circuits and controlled by a predetermined group of the low order digits of said quantities, said accumulator passing on to the high order digits the quantities as accumulated, and means for positioning said drum means in accordance with a variable that determines which of the digital quantities is to be read from said drum means.

6. A low speed computer comprising cam surfaced drum means for storing predetermined digital quantities thereon, a cam actuated electric switch for each digit, sequential switching means for periodically testing the status of said cam actuated switches, electric motor means, first circuit means connected to said sequential switching means for controlling said motor means, an electronic accumulator, second circuit means connected to said sequential switching means for introducing a predetermined group of the low order digits to said accumulator, third circuit means connected to the output of said accumulator for controlling said motor means, means for rotating said drum means in accordance with a given function, and means for initiating the operation of said sequential switching means in accordance with an independent function whereby said motor means is actuated an amount dependent upon given ones of said digital quantities in accordance with said two independent functions.

7. A low speed computer comprising cam surfaced drum means for storing predetermined digital quantities thereon, a cam actuated electric switch for each digit, sequential switching means for periodically testing the status of said cam actuated switches, electric motor means, first circuit means connected to said sequential switching means for controlling said motor means, an electronic accumulator, having a flip-flop element corresponding to each of a predetermined group of low order digits, second circuit means connected to said sequential switching means for sequentially connecting said cam actuated switches to said flip-flop elements, said flip-flop elements being connected together in series for carry action between elements, third circuit means connected to the output of said accumulator for controlling said motor means, means for rotating said drum means in accordance with a given function, and means for initiating the operation of said sequential switching means in accordance with an independent function whereby said motor means is actuated by an amount dependent upon given ones of said digital quantities in accordance with said two independent functions.

8. An electronic accumulator comprising a series of flip-flop trigger elements, each element having an input and an output, circuit means connecting said elements in series for carrying the output of one element to the input of an adjacent element, and other circuit means for connecting all of said inputs to a trigger signal source in sequence.

9. An electronic accumulator comprising a plurality of trigger type flip-flop elements each having an input and an output, means connecting the output of each element to the input of another element with the exception of a final element, sequential switching means, and circuit means for connecting the inputs of said elements to said switching means in order that signals may be applied to each of said inputs in sequence to accumulate inputs.

10. An electronic accumulator comprising a plurality of trigger type flip-flop elements each having an input and an output, a trigger signal source for actuating said elements, first circuit means connecting said elements in series for carrying a signal from one element to the next, a sequential switching device, second circuit means connecting said switching device to each of the inputs, and third circuit means for connecting said signal source to said switching device for sequentially delivering trigger signals to predetermined inputs of the accumulator.

11. An electronic accumulator comprising a plurality of trigger type flip-flop elements each having two inverter circuits being cross connected to produce two stable states, a common input circuit for said inverter circuits to allow a trigger pulse to change the inverter circuits from one stable state to the other, an output circuit for one of said inverter circuits in each element, first circuit means for connecting the output circuit of each element to the common input circuit of another element to connect the elements in series in order to cause an output pulse to carry from one element to the next, a source of trigger pulses, a cyclically operable sequential switching device for connecting said source to a plurality of circuits in sequence, switch means in each of said plurality of circuits for permitting a trigger pulse to pass over predetermined circuits during each cycle of said sequential switching device, second circuit means for connecting the common input circuit of each element to one of said plurality of circuits so that the predetermined trigger pulses will change the stable state of their respective elements in order that the pulse will be stored or will produce an output pulse to be carried to the next succeeding element.

12. The combination according to claim 11 further including means connected to the output of the last element in the series for carrying each output pulse from the same.

13. In an electronic accumulator for low speed accumulation, a plurality of trigger type flip-flop elements connected in series for accumulating binary information, parallel input circuits for said elements, and sequential switching means for connecting said input circuits in sequence to a signal source, said sequential switching means operating at a speed that allows ample time for carries to be effected to all of said elements between connection of each input circuit in sequence.

References Cited in the file of this patent

UNITED STATES PATENTS

| | | |
|---|---|---|
| 2,405,664 | Mumma | Aug. 13, 1946 |
| 2,422,334 | Bedford | June 17, 1947 |
| 2,428,770 | Albert | Oct. 14, 1947 |
| 2,434,270 | Holden | Jan. 13, 1948 |
| 2,442,403 | Flory | June 1, 1948 |
| 2,450,516 | Kinkead | Oct. 5, 1948 |
| 2,575,342 | Gridley | Nov. 20, 1951 |
| 2,597,866 | Gridley | May 27, 1952 |